Nov. 11, 1969   R. HAAPALA   3,477,135
CAKE DECORATOR'S GAUGE
Filed March 26, 1968   2 Sheets-Sheet 1

INVENTOR
RAY HAAPALA

BY
*James H. Littlepage*
ATTORNEY

Nov. 11, 1969  R. HAAPALA  3,477,135
CAKE DECORATOR'S GAUGE
Filed March 26, 1968  2 Sheets-Sheet 2

INVENTOR
RAY HAAPALA

BY *James H. Littlepage*
ATTORNEY

United States Patent Office

3,477,135
Patented Nov. 11, 1969

3,477,135
CAKE DECORATOR'S GAUGE
Ray Haapala, Dassel, Minn. 55325
Filed Mar. 26, 1968, Ser. No. 716,035
Int. Cl. B23q *17/04;* G01b *3/00, 5/00*
U.S. Cl. 33—174          9 Claims

ABSTRACT OF THE DISCLOSURE

A hollow conical dome is provided with a downwardly projecting centering pin and radial guideways spaced at angular intervals corresponding to divisions into which the periphery of a cake is to be divided. Slidably insertable in the guideways are pins with down-turned outer ends which are used to score the cake periphery and the upper outside corner thereof. The dome adjacent the guideways is numbered according to the number of desired divisions into which the cake periphery is to be marked, and the dome is also marked concentrically into divisions of different radii by which the inward extent of the pins and, hence, the radial outward extent of their downwardly bent outer ends can be gauged.

PRIOR ART

Stalous and Gillette, 583,695; Fairbank, 1,297,671; Hughes, 1,629,164; Leve, 2,308,817; Urshan, 2,614,328; and Steketee, 3,132,678.

OBJECTS

The primary object of the invention is to provide a cake decorator's gauge for lightly scoring the periphery of a round cake and, if desired, the upper outside corner thereof, into a desired number of divisions, this capability constituting a broad and advantageous distinction over the known prior art devices. In decorating a fancy cake, such as a wedding cake, it is customary to make a repeating design not only on the cake top, but also around its periphery, and without some sort of gauge, it is very difficult to judge the proper size of the design units or to make the repeat come out evenly. The broad objective of this invention is to provide a cake decorator's tool with which he can produce uniform and properly sized and spaced designs.

Another object of the invention is to provide a gauge which can be set down over a cake without causing a mess, and which also can be used for establishing the center of the cake. Usually, before a fancy cake is decorated, it is given a white or other colored preliminary coating of icing, and it is essential that only faint scorings be made to establish the metes and bounds of the designs to be applied; and above all, the preliminary coating must not be lifted or smeared where the marks are made. According to this invention, these objectives are accomplished by the provision of a guage which does not touch the cake except at the points or lines to be marked.

A further object is to provide a gauge which is used not only for marking a cake into a desired number of divisions, but which can be accommodated to cakes of various diameters, and for establishing the centers of cakes of various diameters. For these latter puroposes, it is intended not only to provide radially extensible marking pins, but also to provide two sets of pins, the pins in one set being longer than the other, so that two ranges of cake sizes may be gauged.

These and other objects will be apparent from the following drawings, in which.

Figure 1:
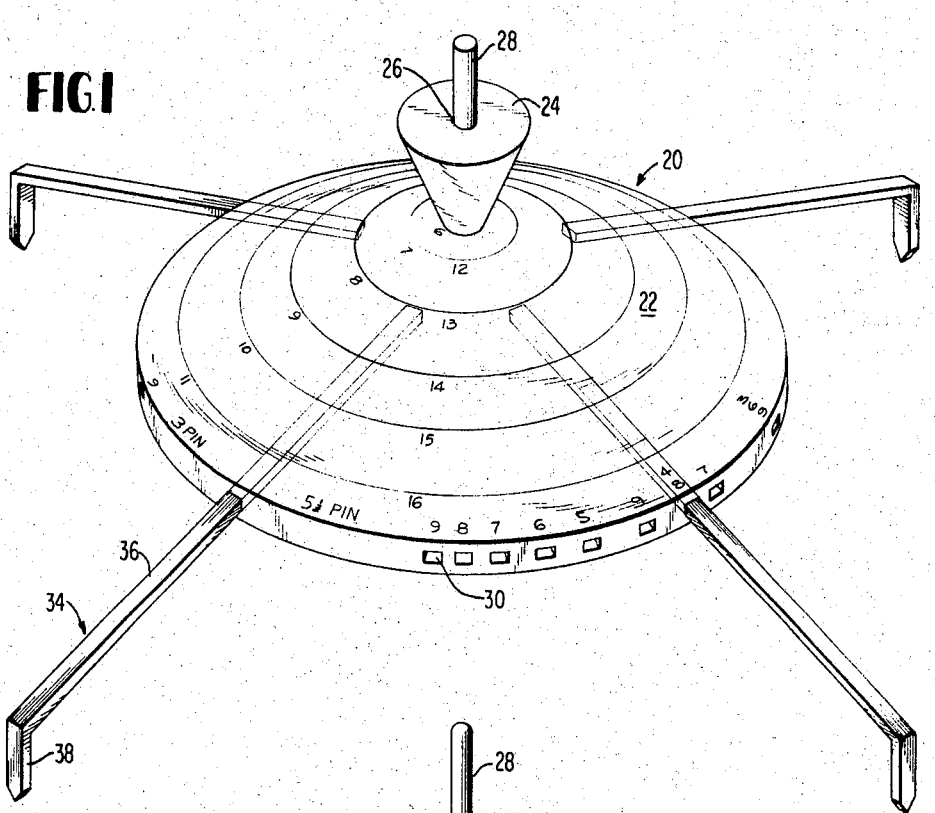
FIG. 1 is a perspective view of the cake decorator's gauge, with a set of five and one-half inch pins at 90° for use in marking a thirteen-inch cake into four divisions.
Figure 3:
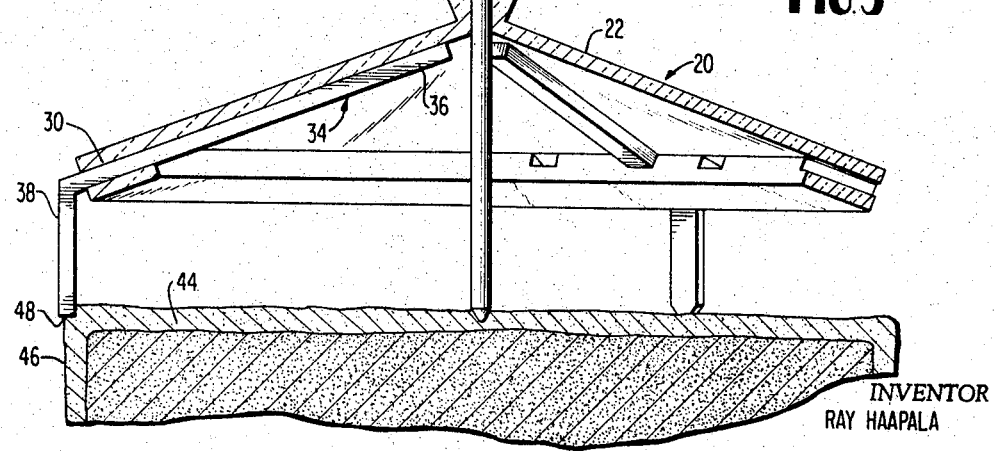
FIG. 3 is a cross section along the line 3—3 of FIG. 2.
Figure 2:
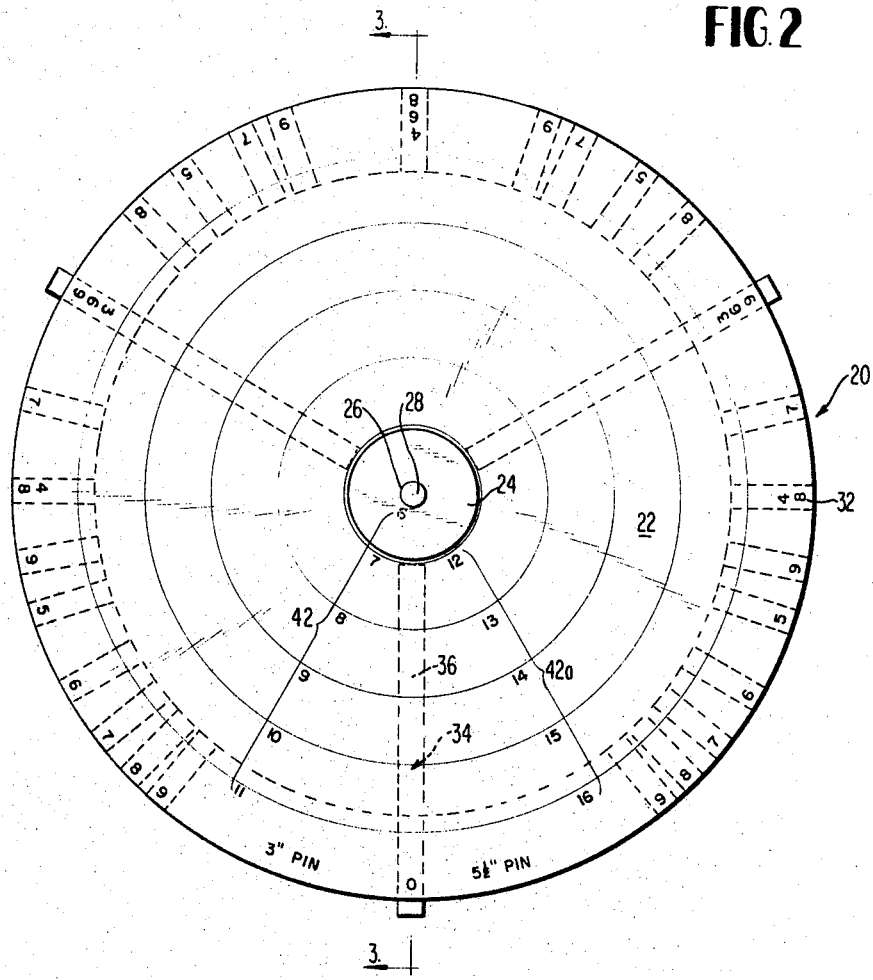
FIG. 2 is a plan view of the gauge, showing a set of three-inch pins in position of use in dividing a six-inch diameter cake into three sections.

Referring now to the drawings, in which like reference numerals denote similar elements, the cake decorator's gauge 20 comprises an annular top dome 22 of hollow conical configuration, preferably made of clear plastic, and having a central knob 24 with a vertical hole 26 therethrough for slidably accommodating a center pin 28 which, as will be apparent hereinafter, may be used for marking the center of a cake 44.

Angularly spaced around dome 22 are radial guideways, for example, twenty-eight if the cake is to be marked into a maximum of nine divisions. Correlated with the guideways are division numbers 32. Slidably disposable in guideways 30 are sets of pins 34, for example, nine pins to a set. Pins 34 have straight shanks 36 and downturned arms 38 at their outer ends, and marked around dome 22 are a series of concentric, radially spaced circles 40 which bear diameter numbers 42, 42*a*.

In order to adapt the gauge to a wide range of cake diameters, there are provided two sets of pins 34 and 34*a*. In the present example, the shanks 36 of pins 34 would be three inches long and the shanks 36*a* of pins 34*a* would be five and one-half inches long, it being understood that the exact dimensions would vary according to the proportions of the correlated elements. If pins 34 were used, the diameter number "8" would indicate to the user that, if the inner ends of the shanks 36 were placed at a certain circle, utilizing the diameter marks 42 the diameter encompassed by arms 38 would be eight inches; whereas, utilizing diameter marks 42*a*, and by placing the nine ends of shanks 36*a* of pins 34*a* at the same circle, the diameter encompassed by the arms 38*a* would be thirteen inches.

Let it be assumed that the cake to be marked is eight inches in diameter, and the cake is to be marked into nine divisions. The user selects the nine pins 34 and inserts them all into the "9" guideways, including the un-numbered one which is common to all divisions, until their inner ends are at the "8" circle. The gauge is then set down over the cake 44, the conical shape of the dome assuring that it will not smear the cake top, which presumably has a base layer of icing on it. The down-turned arms 38 of the pins will lightly core the periphery 46 and, if desired, center pin 28 can be moved down to mark the center of the cake. If the gauge is moved down over the cake sufficiently, the junctures of arms 38 and shanks 36 will indent the cake at its upper outside corner 48 so that, if desired, radial divisions can be marked across the top of the cake from the center mark. Thereafter, when the gauge has been removed, a suitable design can be repeated around the cake within the marked divisions.

Figure 4:
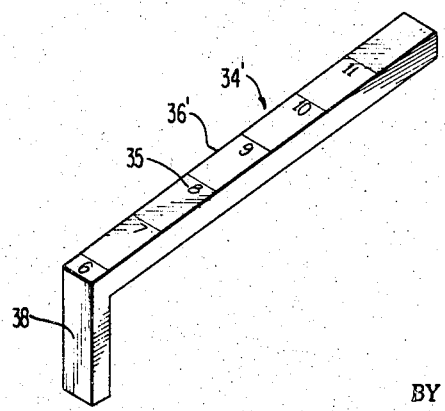
FIG. 4 is a perspective view of an alternate form of pin.

FIG. 4 shows an alternate form of pin 34 bearing diameter numbers 35 on the shanks 36', and having an unpointed arm 38'. This form of pin could be used if dome 22 were made of opaque or non-transparent material. The diameter number appearing on the pin adjacent the outer edge of the dome would indicate the diametric span of arms 38'.

I claim:

1. A cake decorator's gauge for marking a cake into a desired number of divisions comprising,
    an annular top member having
        a series of angularly spaced radial guideways disposed thereon, the angular spacing of the guideways corresponding to various numbers of equal divisions to be demarked on the cake,
numerical indicia on the top member correlated to the respective guideways and representative of various numbers of desired divisions,
and at least one set of similar pins having shanks of equal length adapted to be engaged selectively in said guideways with outer ends thereof adapted to engage the cake for marking the same.

2. The combination claimed in claim 1, said pins having arm portions angularly disposed with respect to their shanks for engaging the periphery of the cake to be marked.

3. The combination claimed in claim 1, and a center pin in said top member.

4. The combination claimed in claim 1, said top member being generally in the form of a cone and said guideways extending radially along the side of the cone, whereby the pin shanks, when extended outwardly from the top member, will continue along projections of the cone so that the top member may be maintained above the cake to be marked.

5. The combination claimed in claim 4, said pins having arm portions angularly disposed with respect to their shanks for engaging the periphery of the cake to be marked.

6. The combination claimed in claim 5, and a center pin extending downwardly from said top member at the center of said cone.

7. The combination claimed in claim 6, said center pin being slidably disposed in said top member.

8. The combination claimed in claim 1, the shanks of said pins being slidable lengthwise in said guideways, and at least one series of radially spaced indicia on said top member for demarking predetermined locations for the inner ends of said pin shanks corresponding to desired radial extent limits for the outer ends of said pins.

9. The combination claimed in claim 8, there bing first and second sets of pins, the pins in the first set having shanks of one given length and the pins in the other set having shanks of another given length, and there being first and second sets of radially spaced indicia on said top member, wherein the first and second sets of indicia demark locations respectively for the inner ends of the shanks of the first and second sets of pins and thereby predetermine the radial outward extent of either set of pins.

References Cited

UNITED STATES PATENTS

| | | | |
|---|---|---|---|
| 583,695 | 6/1897 | Stalons et al. | 33—174 |
| 681,551 | 8/1901 | Hulse et al. | 33—1 |
| 1,297,671 | 3/1919 | Fairbank | 33—174 |
| 1,629,164 | 5/1927 | Hughes | 33—174 |
| 2,308,817 | 1/1943 | Leve | 33—174 |
| 2,614,328 | 10/1952 | Urshan | 33—174 |
| 2,716,950 | 9/1955 | Johnston | 107—47 |
| 2,727,475 | 12/1955 | Fritschi | 107—47 |
| 3,132,678 | 5/1964 | Steketee | 33—174 |

FOREIGN PATENTS 1,474,187  2/1967  France.

SAMUEL S. MATTHEWS, Primary Examiner

U.S. Cl. X.R.

107—47